(12) United States Patent
Krishnamurthy et al.

(10) Patent No.: US 12,556,220 B2
(45) Date of Patent: Feb. 17, 2026

(54) TUNABLE BANDPASS LOW NOISE AMPLIFIER

(71) Applicant: Intel Corporation, Santa Clara, CA (US)

(72) Inventors: Sashank Krishnamurthy, Hillsboro, OR (US); Ofir Degani, Nes-Ammim (IL); Ashoke Ravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 17/819,329

(22) Filed: Aug. 12, 2022

(65) Prior Publication Data

US 2024/0056120 A1    Feb. 15, 2024

(51) Int. Cl.
*H04B 1/16*     (2006.01)
*H04B 1/00*     (2006.01)
(Continued)

(52) U.S. Cl.
CPC ........... *H04B 1/525* (2013.01); *H04B 1/0078* (2013.01); *H04B 1/30* (2013.01); *H04B 2001/307* (2013.01)

(58) Field of Classification Search
CPC .. H04B 1/0035; H04B 1/0078; H04B 1/0082; H04B 1/16; H04B 1/302; H04B 2001/1063

See application file for complete search history.

(56) References Cited

U.S. PATENT DOCUMENTS

| | | | | |
|---|---|---|---|---|
| 7,482,879 B2 * | 1/2009 | Koutani | ................ | H03F 1/223 330/311 |
| 9,774,303 B1 * | 9/2017 | Ayranci | ................ | H03F 1/223 |

(Continued)

FOREIGN PATENT DOCUMENTS

| | | |
|---|---|---|
| CN | 107040239 A | 8/2017 |
| CN | 109560775 A | 4/2019 |

OTHER PUBLICATIONS

Filipe Araujo; Wideband CMOS RF Front-End Receiver with Integrated Filtering; Jun. 25, 2015; Department of Microelectronics & Computer Science, Lodz University of Technology.

(Continued)

*Primary Examiner* — Tuan Pham
(74) *Attorney, Agent, or Firm* — 2SPL Patent Attorneys PartG mbB; Yong Beom Hwang

(57) ABSTRACT

A tunable bandpass low-noise amplifier (LNA). The LNA includes a plurality of N-path filters and a plurality of cascode amplifiers. The cascode amplifiers are configured to amplify an input signal. Each N-path filter is coupled to a different one of the plurality of cascode amplifiers. The plurality of N-path filters are driven by local oscillator (LO) signals having different frequencies, and output nodes of the plurality of cascode amplifiers are coupled in parallel. The frequencies of the LO signals may be symmetrically spaced around a desired frequency ($f_{LO}$). Each N-path filter may be coupled to a source of the common-gate device of the coupled cascode amplifier. The LO signals may be generated by a digital-to-time converter (DTC)-based frequency synthesizer. The frequencies of the LO signals supplied to the N-path filters may be adjusted to tune the bandwidth of the bandpass LNA.

19 Claims, 10 Drawing Sheets

(51) Int. Cl.
*H04B 1/30* (2006.01)
*H04B 1/525* (2015.01)

(56) References Cited

U.S. PATENT DOCUMENTS

| | | |
|---|---|---|
| 9,917,614 B1 | 3/2018 | Kang |
| 2013/0043946 A1* | 2/2013 | Hadjichristos .......... H03F 1/223 |
| | | 330/252 |
| 2017/0279416 A1 | 9/2017 | Maxim et al. |

OTHER PUBLICATIONS

Ahmad Mirzaei; Reconfigurable RF Front-Ends for Cellular Receivers; Oct. 3, 2010; IEEE.

* cited by examiner

TUNABLE BANDPASS LOW NOISE AMPLIFIER

BACKGROUND

The increasing demand for wireless data bandwidth calls for higher bandwidths and modulations scheme. Recently, multi-carrier schemes have been proposed to elevate further the throughput from a given device. WiFi Triple BanD Concurrency (TBDC) and Single band Multi Carrier (SMC) schemes allow two simultaneous asynchronous links at any two channels in the 2.4-2.5 GHz and 5-7 GHz bands from a single device sharing the same antenna infrastructure. Since two transceivers share the same antenna at different channels, possibly in the same band, there is a need to mitigate a cross talk and leakage of a signal from a transmit stream to a receive stream, either as an out-of-channel blocker or an in-channel noise.

Previous solutions involve low-noise amplifiers and down-conversion mixers followed by tunable analog baseband gm-C filters. Other solutions involve the use of N-path mixers running at a single local oscillator (LO) frequency. Higher order filtering in such receivers have been demonstrated by driving the N-path mixer with higher order impedance loads.

High-order analog baseband gm-C filters have inherent quality factor-dynamic range/distortion trade-offs. Those are elaborate analog designs that do not scale with process and require redesign for each process node. As such, those are sensitive to process corners that results in over-design which requires cost, area, and power. Additionally, those analog baseband filters come after a low noise amplifier (LNA) that amplifies not only the desired signal but also in-band blockers, which eventually limits the performance of the multi-channel transceiver.

Achieving a high tunable range in bandwidth, while maintaining higher order filtering, in analog baseband gm-C filters and higher-order single-frequency N-path mixers involves extensive tuning of capacitors, resistors, transistor sizes, and bias currents. Such filters also have a poor yield due to process variations. To account for all of these, an extensive overdesign of such filters is needed, leading to power penalty.

Switch size limits the far-out rejection offered by the single-frequency N-path mixers. A prior two-frequency N-path filter solution does not have a simple method of tuning the center frequency/bandwidth and has limited isolation between the two N-path filters.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
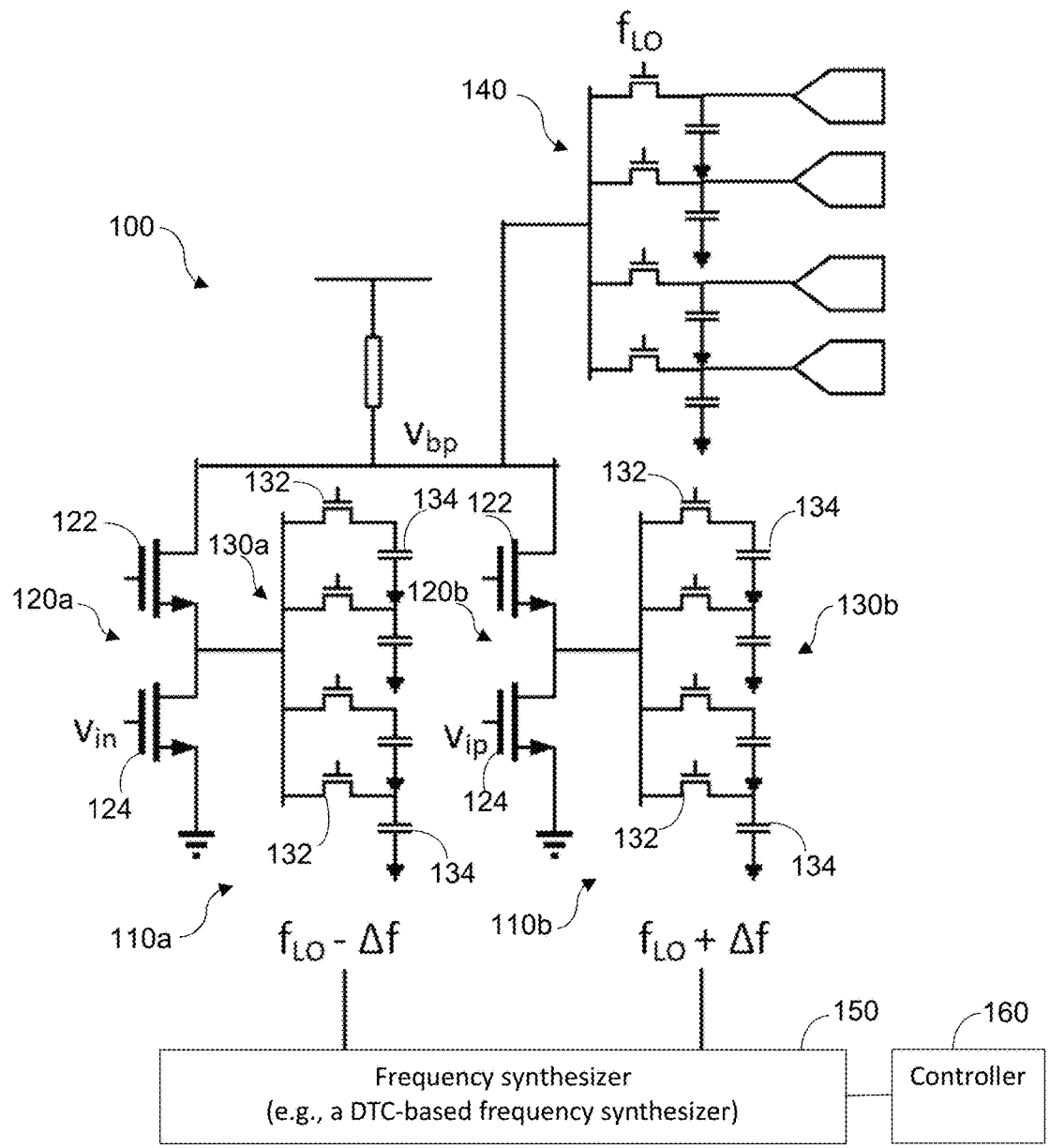
FIGS. 1A and 1B show an example LNA for a 2-frequency N-path bandpass filter.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for a novel bandpass low-noise amplifier (LNA). A bandpass LNA is an LNA that embeds a high order digitally tunable bandpass filter in the LNA to allow improved rejection to external and internal blockers. The bandpass LNAs according to the examples disclosed herein are digitally tunable both for bandwidth and center frequency of the passband. In example LNAs, a digitally tunable bandpass filter that is embedded in the LNA is built by summing up multiple N-path filters. Each N-path filter is driven by a different local oscillator (LO) signal. The LO frequencies driving the multiple N-path filters may be precisely controlled by a frequency synthesizer (e.g., a digital-to-time converter (DTC)-based frequency synthesizer). The LO frequencies that drive the multiple N-path filters are spaced closely around the center frequency of the band of interest. The spacing between the LO frequencies driving the N-path filters may be varied to achieve a tunable bandwidth.

In examples, the bandpass LNA may include a plurality of cascode amplifiers and a plurality of N-path filters. A cascode amplifier is a two-stage amplifier comprising a transconductance amplifier followed by a buffer amplifier. A cascode amplifier may be constructed using field effect transistors (FETs) or bipolar junction transistors (BJTs). One stage of a cascode amplifier is configured in a common source/common emitter mode and the other stage of the cascode amplifier is configured in a common gate/common base mode. A cascode amplifier includes a common source (or common emitter) device feeding into a common gate (or common base) device. Hereafter, examples will be explained with reference to a cascode amplifier including a common source device feeding into a common gate device, but the examples are applicable to a cascode amplifier including a common emitter device feeding into a common base device.

The LNA is split into multiple segments. Each segment of the LNA includes one cascode amplifier and one N-path filter. In each segment, the N-path filter may be coupled to the source node of the common gate device of the cascode amplifier. The input signal may be a differential signal and the positive and negative polarity of the differential input signals may be appropriately fed to different segments, so that the summed output yields the desired bandpass response. The summed bandpass output may be down-converted to baseband by an N-path mixer driven by an LO frequency equal to the center frequency of the band of interest.

An N-path filter may be based on switched capacitors. Each of the plurality of N-path filters includes N paths coupled in parallel, N being a positive integer greater than one. Each path in an N-path filter may include a switch and a capacitor coupled in series. Each N-path filter is coupled to a different one of the plurality of cascode amplifiers. The plurality of N-path filters are driven by LO signals having different frequencies. The output nodes of the plurality of cascode amplifiers are coupled in parallel. The LO signals that drive the plurality of N-path filters may be symmetrically spaced around a desired frequency ($f_{LO}$).

In examples, the LNA includes a linear combination of N-path filters driven by LO signals. The frequencies of the LO signals may be spaced with symmetrical offsets around the desired frequency ($f_{LO}$) to implement a bandpass filter with higher order roll-off centered at $f_{LO}$. The input signal to be amplified by the cascode amplifiers may be a differential signal. The input signal is fed to one or more pairs of cascode amplifiers. For example, the number of N-path filters is two for each half circuit and the two N-path filters may be driven by LO signals at $f_{LO}+\Delta f$ and $f_{LO}-\Delta f$. In another example, the number of N-path filters is four for each half circuit and one pair of N-path filters coupled to a positive (or negative) port of a differential input may be driven by LO signals at $f_{LO}+\Delta f_1$ and $f_{LO}-\Delta f_1$, and another pair of N-path filters coupled to a negative (or positive) port of a differential input may be driven by LO signals at $f_{LO}+\Delta f_2$ and $f_{LO}-\Delta f_2$.

In example LNAs disclosed herein, the tunable bandwidths may be achieved through precise (digital) control of the LO frequencies (i.e., the LO frequency offset) driving the different N-path filters, with minimal tuning of capacitors and no tuning of other analog components like resistors, transistor sizes, bias currents, etc. This can lead to very high yield despite variations induced by processing and component mismatch. Alternatively, the baseband capacitance of the N-path filter may also be adjusted to control the gain of the LNA.

Summing up multiple N-path filters with appropriate phase results in higher order bandpass responses. For example, summing up four separate N-path filters, followed by down-conversion to baseband by an N-path mixer yields a response with 80 dB/decade RF selectivity. The filter also provides enhanced blocker rejection due to the higher order roll-off.

Access to only the 0° and 180° phase of the input RF signal may be sufficient to synthesize such a response, making it amenable to differential implementations.

A conventional scheme of synthesizing a 2-frequency N-path bandpass filter exhibited limited isolation between the two N-path filters. The multi-frequency N-path bandpass filters in accordance with the examples disclosed herein have inherent isolation since it is placed at the source of the common gate device of the cascode LNA.

The examples disclosed herein have advantages over single-frequency N-path implementations that the far-out rejection is not limited by switch ON resistance but by mismatch between ON resistance of different switches, leading to enhanced far-out rejection.

Figure 1B:
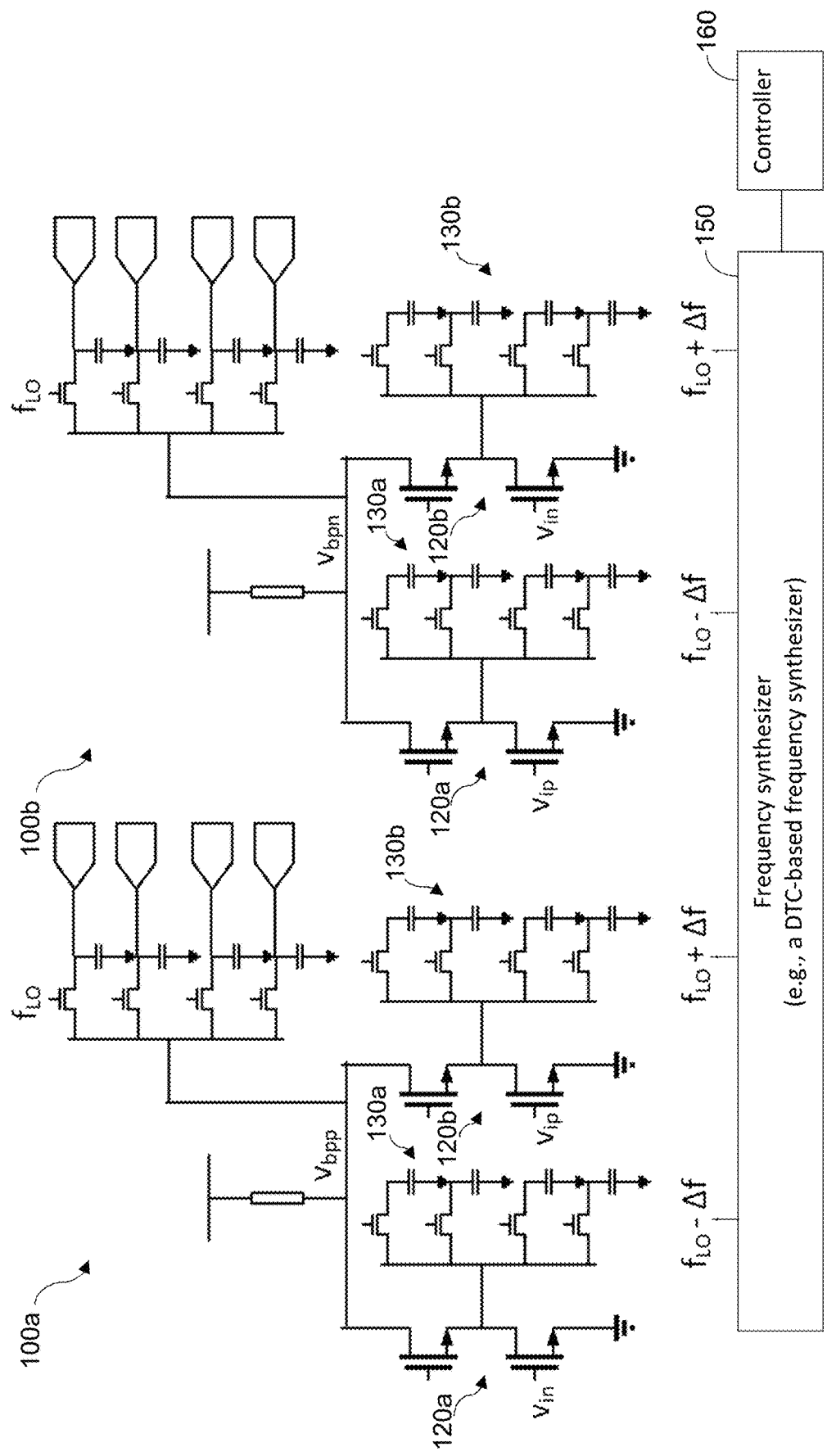

FIGS. 1A and 1B show an example LNA 100 for a 2-frequency N-path bandpass filter. FIG. 1A shows a half circuit of an LNA 100 and FIG. 1B shows a full differential circuit of an LNA 100. Each half circuit generates one polarity of the differential output. The structure of both halves 100a, 100b is the same but the polatiry of the input signals to the cascode amplifiers 120a, 120b and the LO signals driving the N-path filters 130a, 130b of each half 100a, 100b are inversed. Hereafter, the example will be explained with reference to the half circuit in FIG. 1A for simplicity.

The example LNA 100 includes two N-path filters driven by $f_{LO}-\Delta f$ and $f_{LO}+\Delta f$ to synthesize a bandpass filter (e.g., with 40 dB/decade high-frequency roll-off centered at $f_{LO}$). In this example, the LNA 100 includes two cascode amplifiers 120a, 120b and two N-path filters 130a, 130b for each half circuit. The LNA 100 is split into two segments 110a, 110b for each half circuit. Each segment 110a/110b includes one cascode amplifier 120a/120b and one N-path filter 130a/130b.

The N-path filters 130a, 130b may be based on switched capacitors. Each N-path filter 130a, 130b includes N paths coupled in parallel, N being a positive integer greater than one. In this example, each N-path filter 130a, 130b includes four paths. Each path of an N-path filter 130a, 130b may include a switch 132 and a capacitor 134 (e.g., a variable capacitor) coupled in series. The plurality of N-path filters 130a, 130b are driven by LO signals having different frequencies. The LO signals driving the four switches 132 of each N-path filter 130a, 130b may have a 25% duty cycle and are 90 degree out-of-phase, i.e., non-overlapping.

A cascode amplifier 120a, 120b may include a common source device 122 feeding into a common gate device 124. Each N-path filter is coupled to a different one of the plurality of cascode amplifiers. In this example, the N-path filter 130a is coupled to the cascode amplifier 120a, and the N-path filter 130b is coupled to the cascode amplifier 120b. A single bandpass N-path filter is synthesized by placing an N-path filter 130a, 130b at the source of the common gate device 122 of a cascode amplifier 120a, 120b.

The LO signals may be generated by a frequency synthesizer 150 (e.g., a DTC-based frequency synthesizer) and supplied to the N-path filters 130a, 130b. A DTC is a device that can control time delay of an input signal by a digital code. The DTC outputs a delayed replica of an RF clock signal based on a control signal. The frequencies of the LO signals that drive the N-path filters 130a, 130b may be symmetrically spaced around the desired center frequency ($f_{LO}$). For example, the N-path filter 130a may be driven by an LO signal at $f_{LO}-\Delta f$ and the N-path filter 130b may be driven by an LO signal at $f_{LO}-\Delta f$, where $f_{LO}$ is the desired center frequency and $\Delta f$ is a frequency offset. The input signal may be a differential signal ($v_{in}$ and $v_{ip}$). Outputs of the plurality of cascode amplifiers 120a, 120b are combined and may then be down-converted by an N-path mixer 140.

Each N-path filter 130a, 130b is centered at a different LO frequency. These bandpass responses are combined with appropriate phase to realize an effective bandpass filter with higher bandwidth and steeper roll-off than the individual bandpass responses. The combination with different phases (0° and 180°) may be done by using the two differential inputs of the LNA. One polarity (vi n) of the differential input signal is fed to one cascode amplifier 110a and the other polarity ($v_{ip}$) of the differential input signal is fed to the other cascode amplifier 110b, and the output of the bandpass filters ($v_{bp}$) may be then down-converted by the N-path mixer 140.

In the example shown in FIG. 1A, two N-path filters 130a, 130b are driven by LO signals at $f_{LO}-\Delta_f$ and $f_{LO}+\Delta f$ to synthesize a bandpass filter with 40 dB/decade high-frequency roll-off centered at $f_{LO}$ and the output is down converted by an N-path mixer at $f_{LO}$. Consider the circuit in FIG. 1A where the N-path filters 130a, 130b with bandwidths equal to $f_0$ at center frequencies $f_{LO}+\Delta f$ and $f_{LO}-\Delta_f$ are summed anti-phase. This anti-phase summing may be done in differential signaling. The effective bandpass response of the combination of the N-path filters 130a, 130b in FIG. 1A is given by:

$$H_{BPF}^2(\tilde{\omega}) = \frac{2\widetilde{\Delta\omega}}{[1+j(\tilde{\omega}+\widetilde{\Delta\omega})][1+j(\tilde{\omega}-\widetilde{\Delta\omega})]},$$

Equation (1)

where $\tilde{\omega}$ and $\widetilde{\Delta\omega}$ are defined as, $$\tilde{\omega} = \frac{\omega - \omega_{LO}}{\omega_0},$$

Equation (2)

$$\widetilde{\Delta\omega} = \frac{\Delta\omega}{\omega_0}.$$

Equation (3)

$H_{BPF}^2(\tilde{\omega})$ is a bandpass response centered at co w and shows a 40 dB/decade high-frequency roll-off. The bandwidth of $H_{BPF}^2(\tilde{\omega})$ may be tuned by simply tuning the frequency at which the N-path filters 130a, 130b are driven, and this can be precisely controlled by the frequency synthesizer 150 (e.g., a DTC-based frequency synthesizer) with minimal need for capacitance tuning. A controller 160 may control the LO frequency (e.g., the LO frequency offset) for tuning the bandwidth. Tuning $\Delta\omega$ changes the gain as well. In some examples, to keep the gain constant, the bandwidth $\omega_0$ may be scaled. For example, the scaling may be achieved by scaling the baseband capacitors (the capacitors 134 of the N-path filters 130a, 130b) by the controller 160.

Figure 2A:
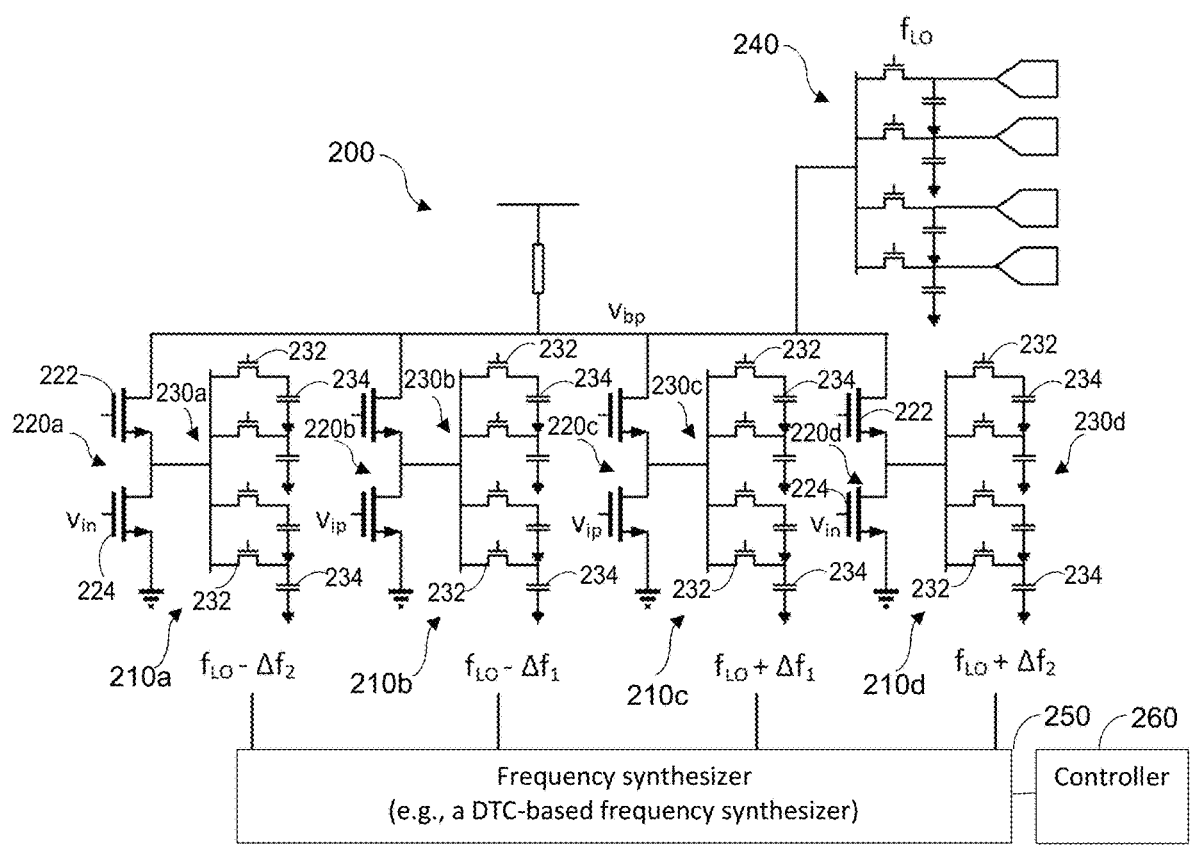
FIGS. 2A and 2B show an example LNA for a 4-frequency N-path bandpass filter.
Figure 2B:
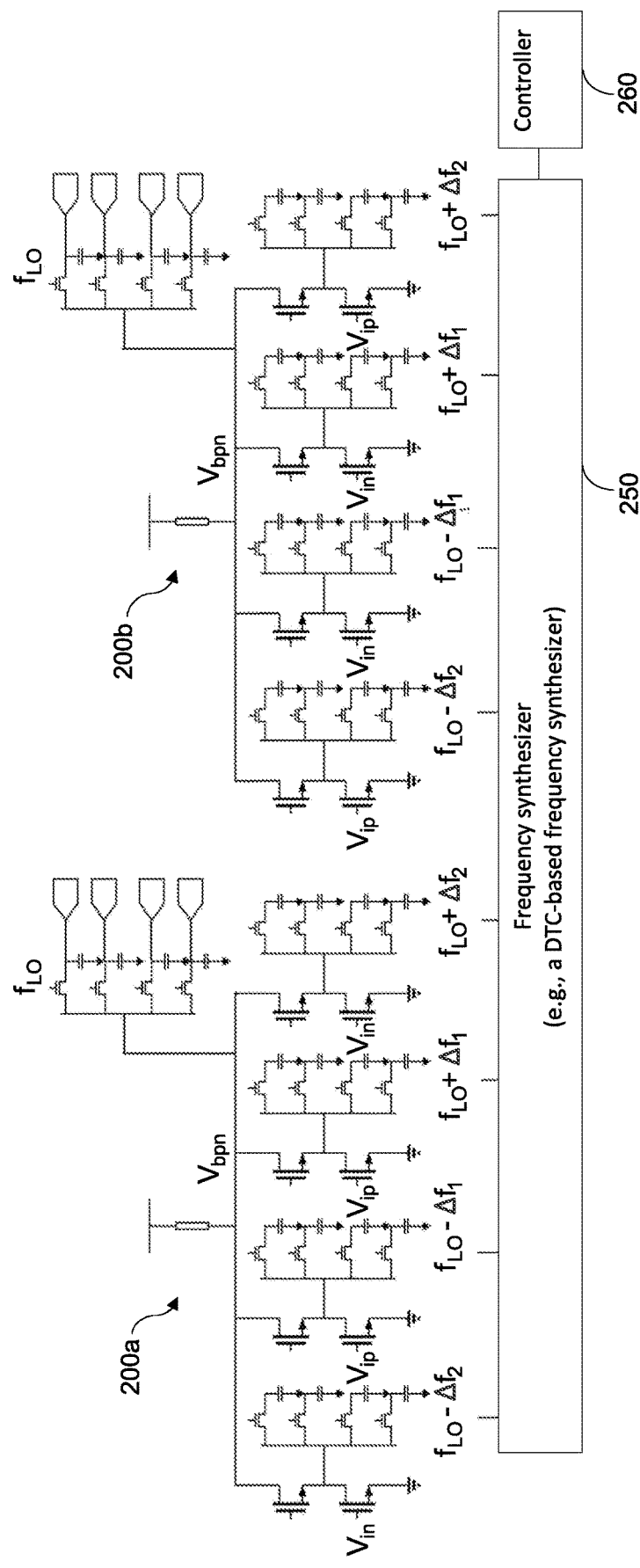

FIGS. 2A and 2B show an example LNA 200 for a 4-frequency N-path bandpass filter. FIG. 2A shows a half of the LNA 200 and FIG. 2B shows a full differential circuit of the LNA 200. Each half circuit 200a, 200b generates one polarity of the differential output. The structure of both halves 200a, 200b is the same but the polarity of the input signals to the cascode amplifiers 220a, 220b, 220c, 220d and the LO signals driving the N-path filters 230a, 230b, 230c, 230d of each half 200a, 200b are inversed. Hereafter, the example will be explained with reference to the half circuit in FIG. 2A for simplicity.

The example LNA 200 includes four N-path filters driven by $f_{LO}-\Delta f_2$, $f_{LO}-\Delta f_1$, $f_{LO}+\Delta f_1$, and $f_{LO}+\Delta f_2$ to synthesize a bandpass filter (e.g., with 60 dB/decade high-frequency roll-off centered at $f_{LO}$). In this example, the LNA 200 includes four cascode amplifiers 220a, 220b, 220c, 220d and four N-path filters 230a, 230b, 230c, 230d for each half circuit. The LNA 200 is split into four segments 210a, 210b, 210c, 210d for each half circuit. Each segment 210a, 210b, 210c, 210d includes one cascode amplifier 220a, 220b, 220c, 220d and one N-path filter 230a, 230b, 230c, 230d.

Each N-path filter 230a, 230b, 230c, 230d includes N paths coupled in parallel, N being a positive integer greater than one. Each path includes a switch 232 and a capacitor 234 (e.g., a variable capacitor) coupled in series. The plurality of N-path filters 230a, 230b, 230c, 230d are driven by LO signals having different frequencies. The LO signals driving the four switches 232 of each N-path filter 230a, 230b, 230c, 230d may have a 25% duty cycle and are 90 degree out-of-phase, i.e., non-overlapping.

A cascode amplifier 220a, 220b, 220c, 220d includes a common gate device 222 and a common source device 224. Each N-path filter is coupled to a different one of the plurality of cascode amplifiers. The N-path filter 230a is coupled to the cascode amplifier 220a, the N-path filter 230b is coupled to the cascode amplifier 220b, the N-path filter 230c is coupled to the cascode amplifier 220c, and the N-path filter 230d is coupled to the cascode amplifier 220d. A single bandpass N-path filter is synthesized by placing an N-path filter 230a, 230b, 230c, 230d at the source of the common gate device 222 of a cascode LNA 220a, 220b, 220c, 220d, respectively.

The plurality of N-path filters 230a, 230b, 230c, 230d are driven by LO signals having different frequencies. The LO signals may be generated by a frequency synthesizer 250 (e.g., a DTC-based frequency synthesizer) and supplied to the N-path filters 230a, 230b, 230c, 230d. The frequencies of the LO signals may be symmetrically spaced around the desired center frequency. Two cascode amplifiers may be driven by the positive input of the differential input signal, and the other two cascode amplifiers may be driven by the negative input of the differential input signal. The two cascode amplifiers driven by one polarity input may have N-path filters at $f_{LO}-\Delta f_1$ and $f_{LO}+\Delta f_1$ at the source of the common gate device, and the two cascode amplifiers driven by the other polarity input may have N-path filters at $f_{LO}-\Delta f_2$ and $f_{LO}+\Delta f_2$ at the source of the common gate device. For example, the N-path filter 230a may be driven by an LO signal at $f_{LO}-\Delta f_2$, the N-path filter 230b may be driven by an LO signal at $f_{LO}-\Delta f_1$, the N-path filter 230c may be driven by an LO signal at $f_{LO}+\Delta f_1$, and the N-path filter 230d may be driven by an LO signal at $f_{LO}+\Delta f_2$, where $f_{LO}$ is the desired center frequency and $\Delta f_1$ and $\Delta f_2$ are frequency offsets. The four cascode amplifiers' output currents are then summed/combined together and may be down-converted to baseband by an N-path mixer 240 at $f_{LO}$.

Each N-path filter 230a, 230b, 230c, 230d is centered at a different LO frequency. These bandpass responses are then combined with appropriate phase to realize an effective bandpass filter with higher bandwidth and steeper roll-off than the individual bandpass responses. The combination with different phases (0° and 180°) may be done by using the two differential inputs of the LNA. One polarity (one of $v_{in}$ and $v_{ip}$) of the differential input signal is fed to two cascode amplifiers 210a, 210d and the other polarity (the other of $v_{in}$ and $v_{ip}$) of the differential input signal is fed to the other cascode amplifiers 210b, 210c and the output of the bandpass filters ($v_{bp}$) is then down-converted to baseband by the N-path mixer 240.

Two 2-frequency N-path filters centered at different offset frequencies may be combined in an anti-phase fashion to obtain an effective 4-frequency N-path filter as shown in FIG. 2A. The effective response of the 4-frequency N-path filter-based bandpass filter is given by:

$$H_{BPF}^4(\tilde{\omega}) = \frac{2[1 + j\tilde{\omega}][\widetilde{\Delta\omega_2^2} - \widetilde{\Delta\omega_1^2}]}{[1 + j(\tilde{\omega} + \widetilde{\Delta\omega_2})][1 + j(\tilde{\omega} - \widetilde{\Delta\omega_2})]} \cdot \frac{1}{[1 + j(\tilde{\omega} + \widetilde{\Delta\omega_1})][1 + j(\tilde{\omega} - \widetilde{\Delta\omega_1})]}$$

Equation (4)

The transfer function $H_{BPF}^4(\tilde{\omega})$ has a 60 dB/decade high frequency roll-off. The signal at node $v_{bp}$ may be down converted to baseband by an N-path mixer 240 at $f_{LO}$, which further increases the order of bandpass filtering at node $v_{bp}$, with an 80 dB/decade high-frequency roll-off. For the specific case where the bandwidth of this N-path mixers is exactly equal to $f_0$, the transfer function to the node $v_{bp}$ is given by:

$$H_{BPF}^5(\tilde{\omega}) = \frac{2[\widetilde{\Delta\omega_2^2} - \widetilde{\Delta\omega_1^2}]}{[1 + j(\tilde{\omega} + \widetilde{\Delta\omega_2})][1 + j(\tilde{\omega} - \widetilde{\Delta\omega_2})]} \cdot \frac{1}{[1 + j(\tilde{\omega} + \widetilde{\Delta\omega_1})][1 + j(\tilde{\omega} - \widetilde{\Delta\omega_1})]}$$

Equation (5)

The bandwidth of $H_{BPF}^4(\tilde{\omega})$ and $H_{BPF}^2(\tilde{\omega})$ may be tuned by simply tuning the frequency at which the N-path filters 230a, 230b, 230c, 230d are driven, and this can be precisely controlled by the frequency synthesizer 250 (e.g., a DTC-based frequency synthesizer) with minimal need for capacitance tuning. The controller 260 may control the LO frequency (e.g., the LO frequency offset) for tuning the bandwidth. In some examples, to keep the gain constant, the bandwidth $\omega_0$ may be scaled. The bandwidth scaling may be achieved by scaling the baseband capacitor (i.e., the capacitors 234 in the N-path filters 230a, 230b, 230c, 230d) by the controller 260.

It should be noted that while FIGS. 1A, 1B, 2A, and 2B illustrate the specific cases of combining two and four N-path filters, respectively, the examples can be extended to a linear combination of any number of N-path filters, for example $2^k$ N-path filters, k being a positive integer.

Figure 3:
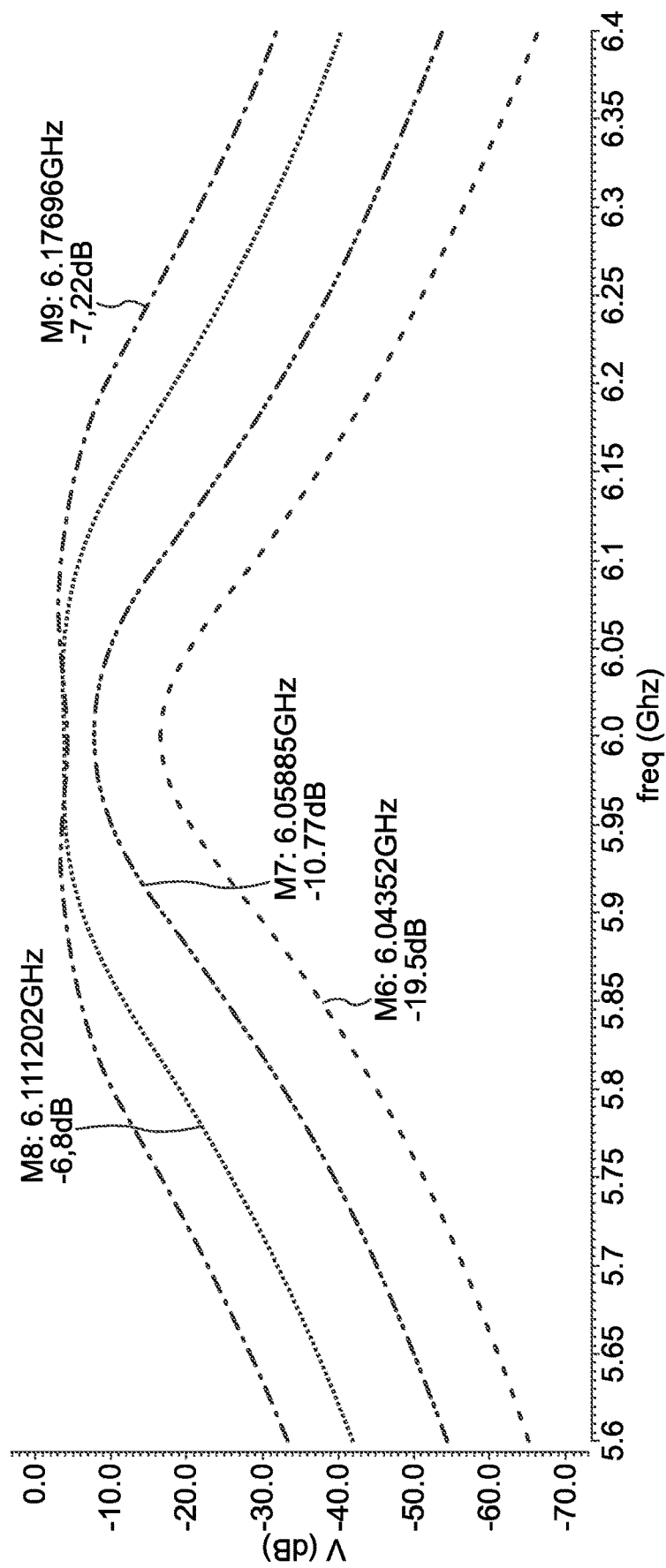
FIG. 3 shows simulation results of bandwidth tuning in the 4-frequency N-path filter-based digital LNA.

FIG. 3 shows simulation results of bandwidth tuning in the 4-frequency N-path filter-based digital LNA as shown in FIG. 2A/2B by tuning the offset frequencies ($\Delta f_1$ and $\Delta f_2$) of the N-path filters alone, with no tuning of the bandwidth of each N-path filter. The simulation was run for $f_{LO}$=6 GHz, a bandwidth of 80 MHz for the four N-path filters at the source of the common gate device and a bandwidth of 200 MHz for the N-path mixer at $f_{LO}$. Under these conditions, FIG. 3 shows the response for the following 4 cases: a) $\Delta f_1$=10 MHz, $\Delta f_2$=30 MHz, b) $\Delta f_1$=20 MHz, $\Delta f_2$=60 MHz, c) $\Delta f_1$=40 MHz, $\Delta f_2$=120 MHz and d) $\Delta f_1$=60 MHz, $\Delta f_2$=180 MHz, yielding effective bandwidths of 87 MHz, 118 MHz, 222 MHz, and 354 MHz, respectively.

Figure 4:
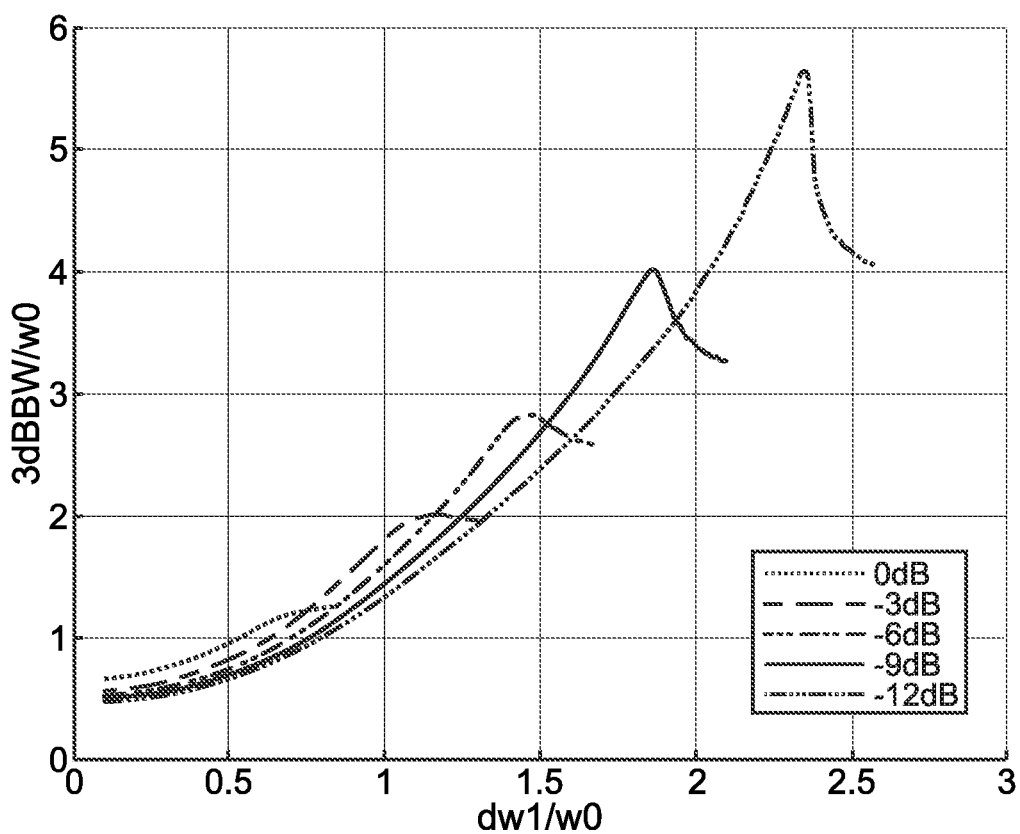
FIG. 4 shows a plot illustrating the range of bandwidth tuning by tuning LO frequencies of N-path filters alone.

The bandwidth tuning for the 4-frequency N-path filter in FIG. 3 is implemented by tuning the LO frequencies alone, while keeping the baseband capacitance constant. This results in bandwidth tuning with change in gain across different settings. The gain in the response corresponds to the gain of the passive N-path filter alone, and a higher gain may be achieved by the LNA. As shown in FIG. 3, there is a variation of as much as 12 dB gain between the different settings. In this method of tuning the bandwidth by tuning the LO frequency of the different N-path filters alone, the amount of bandwidth tuning is limited by the amount of tolerable gain variation, as illustrated by the plot in FIG. 4. FIG. 4 shows a plot illustrating the range of bandwidth tuning by tuning LO frequencies of N-path filters alone for different values of maximum tolerable gain variation. The higher the allowable gain variation, the higher the range of bandwidth tuning.

In addition to the LO frequency tuning (e.g., by adjusting the LO frequency offset $\Delta f$ or $\Delta f_1$ and $\Delta f_2$) as described above, a capacitor tuning (e.g., by adjusting the capacitance of the capacitors 134 or 234) may be implemented to change the bandwidth of each N-path filter while maintaining the same gain and filter shape as the effective bandwidth is tuned. It should be noted that there will be no limitation in the range of bandwidth tuning when a hybrid approach of LO frequency and capacitor tuning is used.

Figure 5:
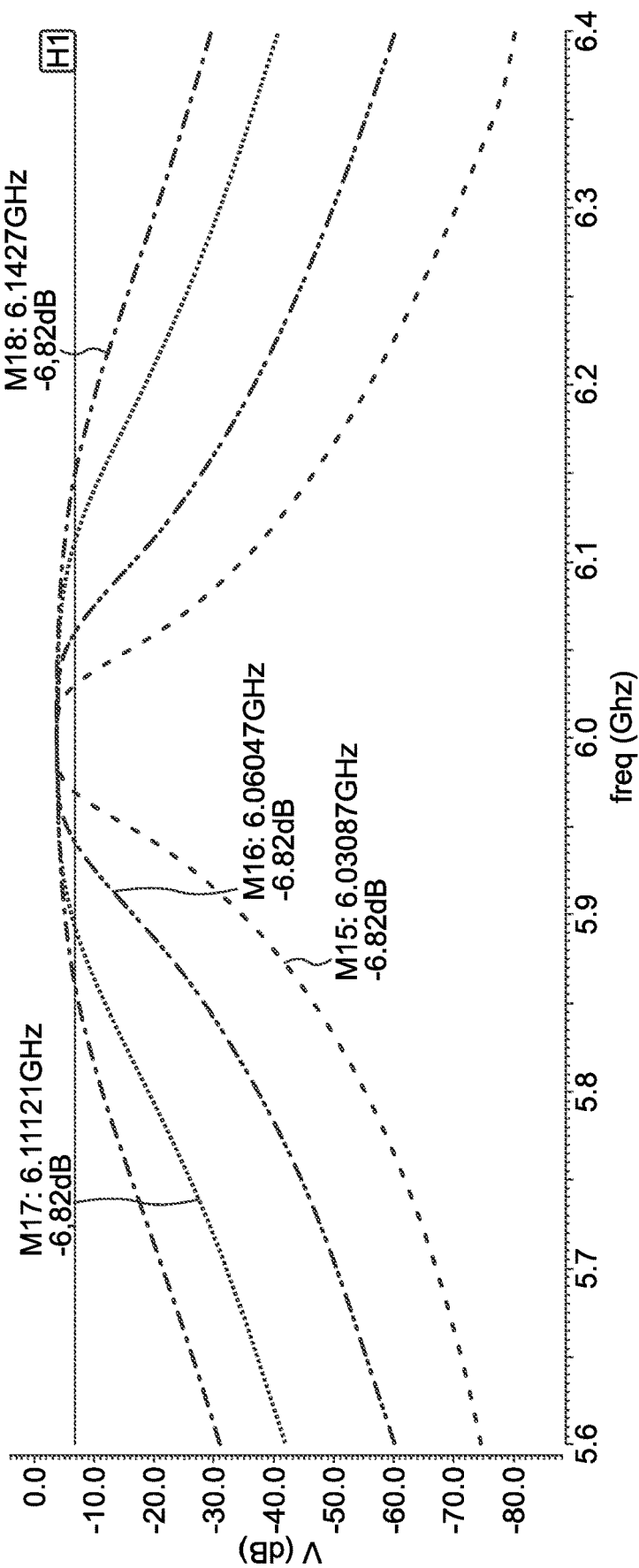
FIG. 5 shows simulation results for bandwidth tuning of a 4-frequency N-path filter by tuning the LO frequencies and baseband capacitance.

FIG. 5 shows simulation results for bandwidth tuning of a 4-frequency N-path filter as shown in FIG. 2A/2B by tuning the LO frequencies and baseband capacitance. This results in bandwidth tuning while maintaining the same gain and filter shape. The gain in the response corresponds to the gain of the passive N-path filter alone, and a higher gain may be achieved by the LNA.

Figure 6:
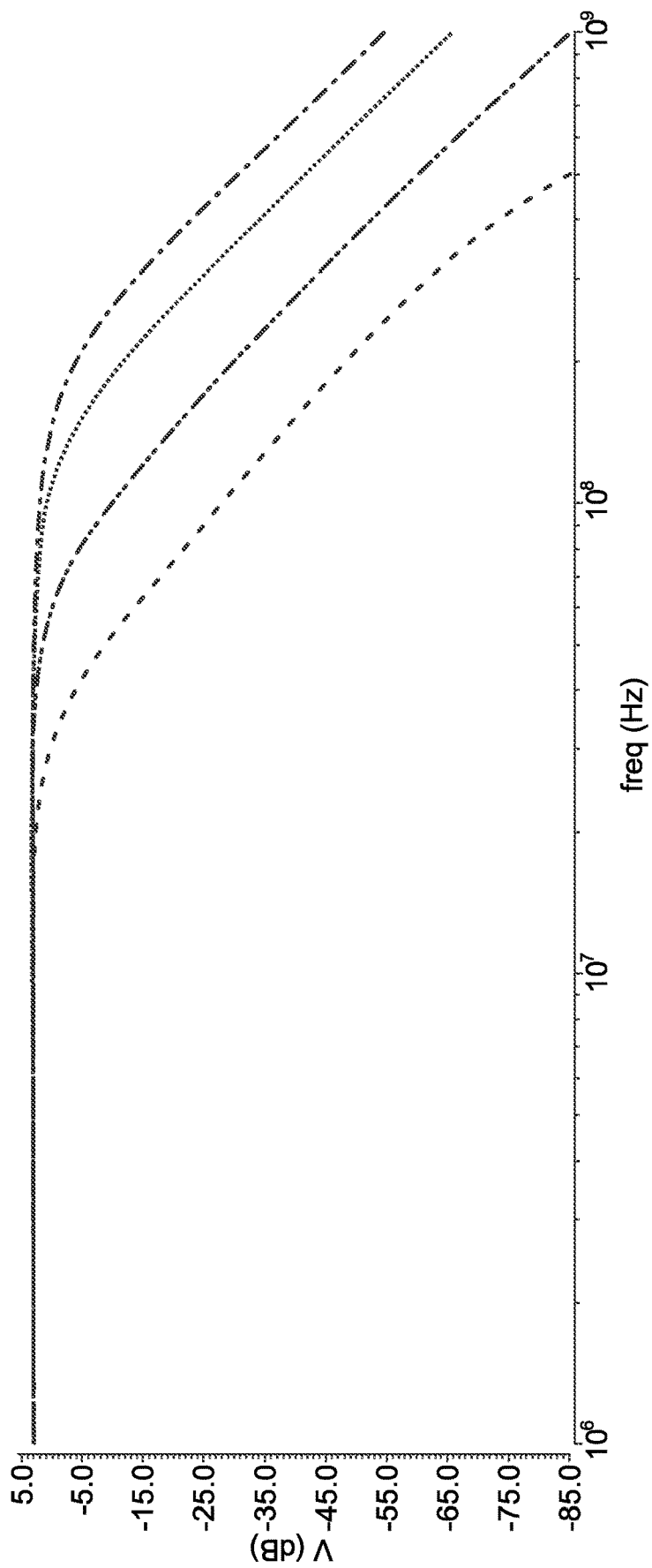
FIG. 6 shows the simulated down-converted baseband response for the bandpass responses of FIG. 5.

In FIG. 5, the different plots indicate the bandpass response for $f_{LO}$=6 GHz for the following conditions: a) $\Delta f_1$=10 MHz, $\Delta f_2$=30 MHz, $f_0$=20 MHz, b) $\Delta f_1$=20 MHz, $\Delta f_2$=60 MHz, $f_0$=40 MHz, c) $\Delta f_1$=40 MHz, $\Delta f_2$=120 MHz, $f_0$=80 MHz and a) $\Delta f_1$=60 MHz, $\Delta f_2$=180 MHz, $f_0$=120 MHz, yielding effective bandwidths of 61 MHz, 121 MHz, 222 MHz, and 300 MHz, respectively. FIG. 6 shows the simulated down-converted baseband response for the bandpass responses of FIG. 5. In FIG. 6, the 80 dB/decade (24 dB/octave) high frequency roll-off is observed.

Figure 7:
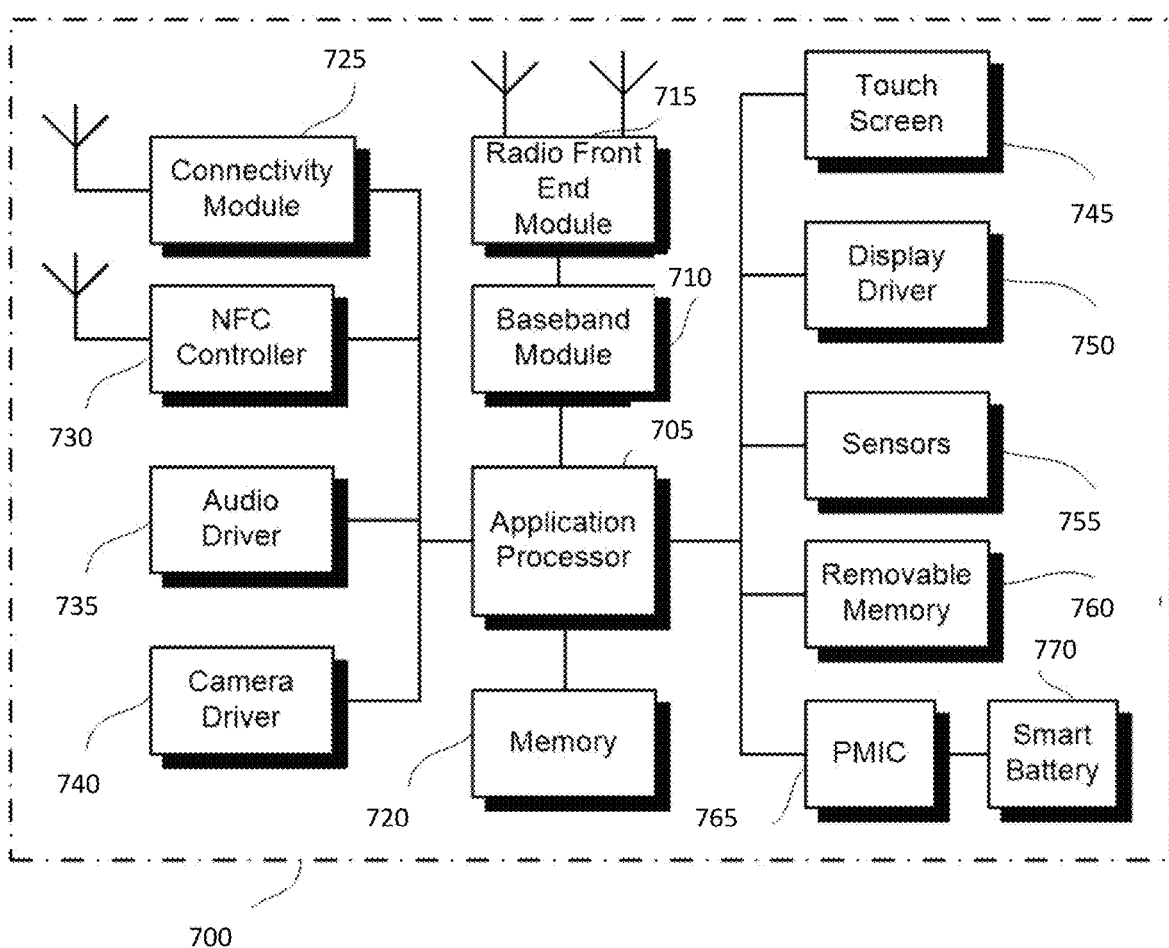
FIG. 7 illustrates a user device in which the examples disclosed herein may be implemented.

FIG. 7 illustrates a user device 700 in which the examples disclosed herein may be implemented. For example, the examples disclosed herein may be implemented in the radio front-end module 715, in the baseband module 710, etc. The user device 700 may be a mobile device in some aspects and includes an application processor 705, baseband processor 710 (also referred to as a baseband module), radio front end module (RFEM) 715, memory 720, connectivity module 725, near field communication (NFC) controller 730, audio driver 735, camera driver 740, touch screen 745, display driver 750, sensors 755, removable memory 760, power management integrated circuit (PMIC) 765 and smart battery 770.

In some aspects, application processor 705 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 710 may be implemented, for example, as a solder-down substrate including one or more integrated circuits, a single packaged integrated circuit soldered to a main circuit board, and/or a multi-chip module containing two or more integrated circuits.

Figure 8:
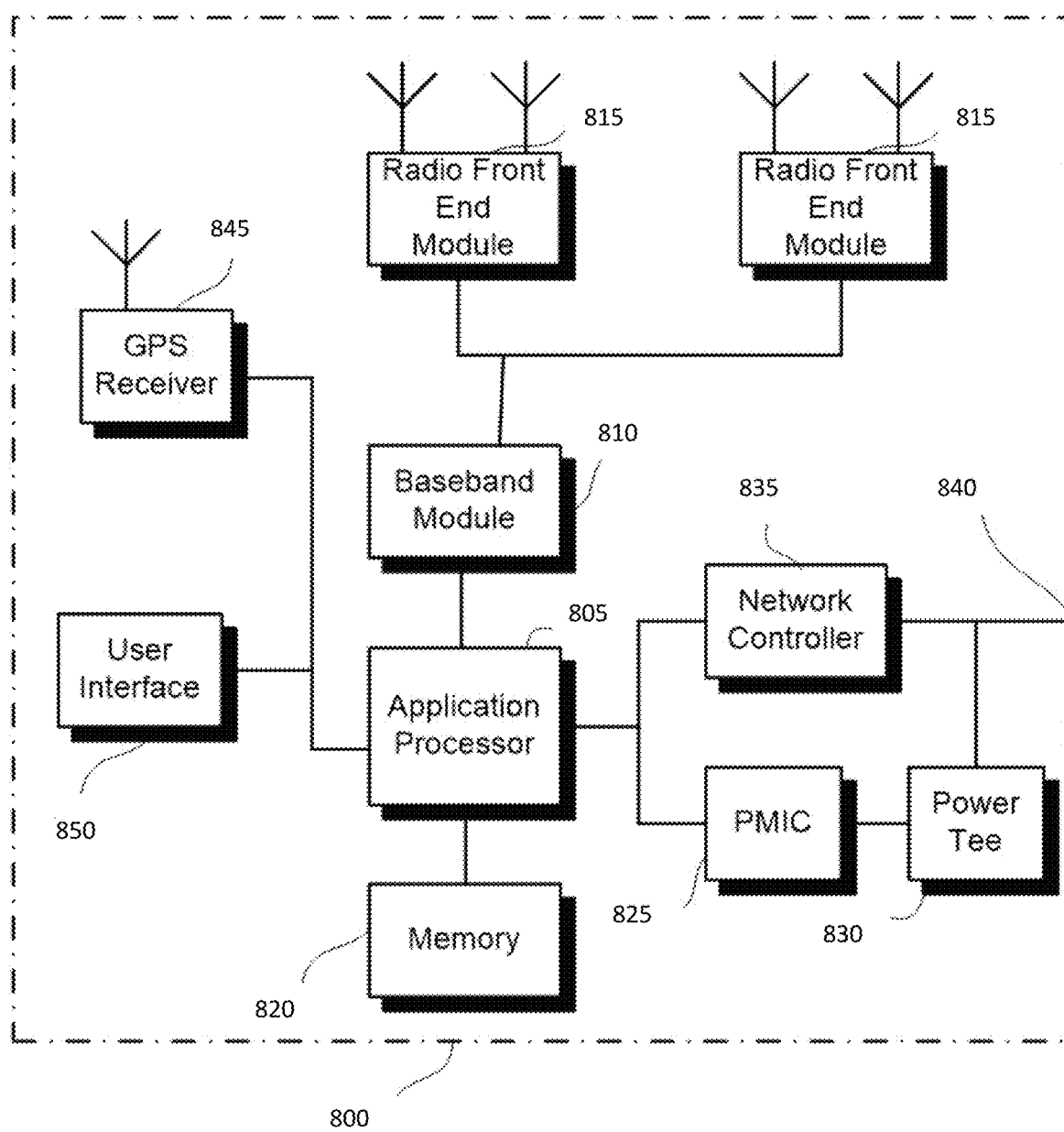
FIG. 8 illustrates a base station or infrastructure equipment radio head in which the examples disclosed herein may be implemented.

FIG. 8 illustrates a base station or infrastructure equipment radio head 800 in which the examples disclosed herein may be implemented. For example, the examples disclosed herein may be implemented in the radio front-end module 815, in the baseband module 810, etc. The base station radio head 800 may include one or more of application processor 805, baseband modules 810, one or more radio front end modules 815, memory 820, power management circuitry 825, power tee circuitry 830, network controller 835, network interface connector 840, satellite navigation receiver module 845, and user interface 850.

In some aspects, application processor 805 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 810 may be implemented, for example, as a solder-down substrate including one or more integrated circuits, a single packaged integrated circuit soldered to a main circuit board or a multi-chip module containing two or more integrated circuits.

In some aspects, memory 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 820 may be implemented as one or more of solder down packaged integrated circuits, socketed memory modules and plug-in memory cards.

In some aspects, power management integrated circuitry 825 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 830 may provide for electrical power drawn from a network cable to provide both power supply and data connectivity to the base station radio head 800 using a single cable.

In some aspects, network controller 835 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 845 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 845 may provide data to application processor 805 which may include one or more of position data or time data. Application processor 805 may use time data to synchronize operations with other radio base stations.

In some aspects, user interface 850 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

An example (e.g., example 1) relates to a low-noise amplifier (LNA). The LNA comprises a plurality of N-path filters and a plurality of cascode amplifiers. The cascode amplifiers are configured to amplify an input signal, wherein each N-path filter is coupled to a different one of the plurality of cascode amplifiers. The plurality of N-path filters are driven by local oscillator (LO) signals having different frequencies, and output nodes of the plurality of cascode amplifiers are coupled in parallel.

Another example, (e.g., example 2) relates to a previously described example (e.g., example 1), wherein the frequencies of the LO signals are symmetrically spaced around a desired frequency ($f_{LO}$).

Another example, (e.g., example 3) relates to a previously described example (e.g., any one of examples 1 or 2), wherein the input signal is a differential signal that is fed to one or more pairs of cascode amplifiers.

Another example, (e.g., example 4) relates to a previously described example (e.g., any one of examples 1-3), wherein each N-path filter comprises a plurality of paths coupled in parallel, and each path comprises a switch and a capacitor coupled in series.

Another example, (e.g., example 5) relates to a previously described example (e.g., any one of examples 1-4), wherein the number of N-path filters is two and the N-path filters are driven by LO signals at $f_{LO}+\Delta f$ and $f_{LO}-\Delta f$.

Another example, (e.g., example 6) relates to a previously described example (e.g., any one of examples 1-5), wherein the number of N-path filters is four and one pair of N-path filters coupled to one polarity of a differential input signal are driven by LO signals at $f_{LO}+\Delta f_1$ and $f_{LO}-\Delta f_1$, and another pair of N-path filters coupled to the other polarity of the differential input signal are driven by LO signals at $f_{LO}+\Delta f_2$ and $f_{LO}-\Delta f_2$.

Another example, (e.g., example 7) relates to a previously described example (e.g., any one of examples 1-6), wherein each cascode amplifier comprises a common-gate device and a common-source device coupled in series, and each N-path filter is coupled to a source of the common-gate device of the coupled cascode amplifier.

Another example, (e.g., example 8) relates to a previously described example (e.g., any one of examples 1-7), further comprising an N-path mixer coupled to an output of the LNA and configured to down-convert the output of the LNA.

Another example, (e.g., example 9) relates to a previously described example (e.g., any one of examples 1-8), further comprising a frequency synthesizer configured to generate the LO signals.

Another example, (e.g., example 10) relates to a previously described example (e.g., example 9), wherein the frequency synthesizer is a digital-to-time converter (DTC)-based frequency synthesizer.

Another example, (e.g., example 11) relates to a previously described example (e.g., any one of examples 1-10), further comprising a controller configured to adjust frequencies of the LO signals supplied to the N-path filters.

Another example, (e.g., example 12) relates to a previously described example (e.g., example 11), wherein the controller is configured to adjust capacitors in the N-path filters.

Another example, (e.g., example 13) relates to a transceiver comprising the LNA as in any one of examples 1-12.

Another example, (e.g., example 14) relates to a user equipment comprising the transceiver of example 13.

Another example, (e.g., example 15) relates to a base station equipment comprising the transceiver of example 13.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or—steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A low-noise amplifier (LNA) comprising:
   a plurality of N-path filters; and
   a plurality of cascode amplifiers configured to amplify an input signal, wherein each N-path filter is coupled to a different one of the plurality of cascode amplifiers,
   wherein the plurality of N-path filters are driven by local oscillator (LO) signals having different frequencies, and output nodes of the plurality of cascode amplifiers are coupled in parallel.

2. The LNA of claim 1, wherein the frequencies of the LO signals are symmetrically spaced around a desired frequency ($f_{L_o}$).

3. The LNA of claim 1, wherein the input signal is a differential signal that is fed to one or more pairs of cascode amplifiers.

4. The LNA of claim 1, wherein each N-path filter comprises a plurality of paths coupled in parallel, and each path comprises a switch and a capacitor coupled in series.

5. The LNA of claim 1, wherein the number of N-path filters is two and the N-path filters are driven by LO signals at $f_{LO}+\Delta f$ and $f_{LO}-\Delta f$.

6. The LNA of claim 1, wherein the number of N-path filters is four and one pair of N-path filters coupled to one polarity of a differential input signal are driven by LO signals at $f_{LO}+\Delta f_1$ and $f_{LO}-\Delta f_1$, and another pair of N-path filters coupled to the other polarity of the differential input signal are driven by LO signals at $f_{LO}+\Delta f_2$ and $f_{LO}-\Delta f_2$.

7. The LNA of claim 1, wherein each cascode amplifier comprises a common-gate device and a common-source device coupled in series, and each N-path filter is coupled to a source of the common-gate device of the coupled cascode amplifier.

8. The LNA of claim 1, further comprising an N-path mixer coupled to an output of the LNA and configured to down-convert the output of the LNA.

9. The LNA of claim 1, further comprising a frequency synthesizer configured to generate the LO signals.

10. The LNA of claim 9, wherein the frequency synthesizer is a digital-to-time converter (DTC)-based frequency synthesizer.

11. The LNA of claim 1, further comprising a controller configured to adjust frequencies of the LO signals supplied to the N-path filters.

12. The LNA of claim 11, wherein the controller is configured to adjust capacitors in the N-path filters.

13. A transceiver comprising the LNA of claim 1.

14. A user equipment comprising the transceiver of claim 13.

15. A base station equipment comprising the transceiver of claim 13.

16. The LNA of claim 11, wherein the controller is configured to digitally tune the frequencies of the LO signals supplied to the N-path filters.

17. The LNA of claim 1, wherein the LNA is configured to generate a differential output.

18. The LNA of claim 1, wherein each N-path filter include four paths, each path comprising a switch and a capacitor coupled in series, and the LO signals driving the four switches of each N-path filter have a 25% duty cycle and are 90 degree out-of-phase.

19. The LNA of claim 1, wherein each of the plurality of cascode amplifiers is constructed with field effect transistors or bipolar junction transistors.

* * * * *